J. T. WARREN.
Cartridge-Box.
No. 2,094. Reissued Oct. 17, 1865.
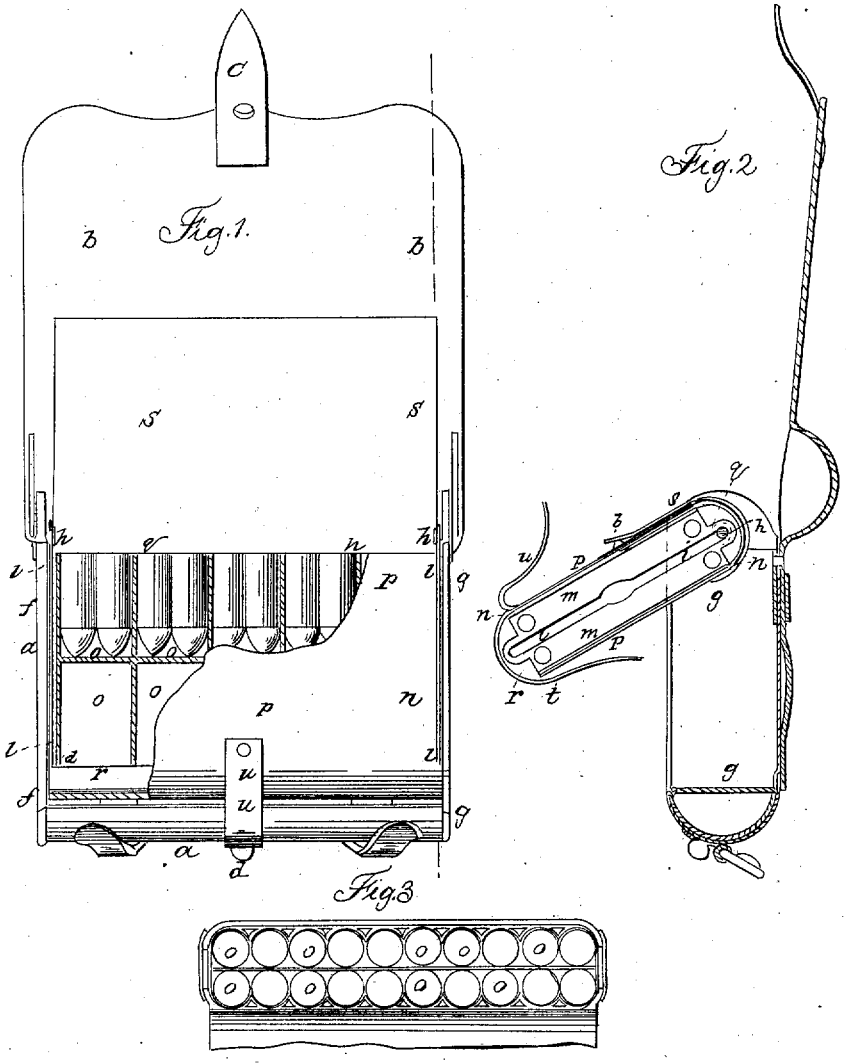
Witnesses:
Chas Tusch
Wm Orum
Inventor:
J. T. Warren
per Munn & Co
Attorneys
N. PETERS, PHOTO-LITHOGRAPHER, WASHINGTON, D. C.

UNITED STATES PATENT OFFICE.

ROBERT A. CHESEBROUGH, OF NEW YORK, ASSIGNEE OF J. T. WARREN, OF STAFFORD, Y. N.

IMPROVEMENT IN CARTRIDGE-BOXES.

Specification forming part of Letters Patent No. 43,373, dated June 28, 1864; Reissue No. 2,094, dated October 17, 1865.

*To all whom it may concern:*

Be it known that J. T. WARREN, of Stafford, Genesee county, New York, did invent a new and useful Improvement in Cartridge-Boxes, for which Letters Patent were granted June 28, 1864, and numbered 43,373; and I, ROBERT A. CHESEBROUGH, assignee of said J. T. WARREN, do hereby declare that the following is a full, clear, and exact description thereof, which will enable others skilled in the art to make and use the same, reference being had to the accompanying drawings, forming a part of this specification.

The invention consists in a new and peculiar manner of hanging or attaching a cartridge-box in and to an outer casing or frame, whereby the box can be easily turned within its outer casing at pleasure, thus allowing the cartridges placed therein to be more readily and conveniently removed therefrom when so desired. The above improvement is adapted to boxes for the carrying of cartridges, whether fixed or loose, by soldiers in the army or navy.

In accompanying plate of drawings my improvement is represented, Figure 1 being a front view of a cartridge-box with the covering piece or flap of the same turned up, and with a portion of the covering for the cartridge-chambers broken away; Fig. 2, a sectional view in plane of line *x x*, Fig. 1, showing mode of hinging of the chamber-box for the cartridges; and Fig. 3, a detail view, to be hereinafter particularly referred to.

*a a* represents the outer frame or box, with a swinging flap or cover-piece, *b*, secured to the upper portion thereof and fastened when desired by a strap, *c*, to a fixed staple, *d*, of the box *a*. The box *a* may be made wholly of tin or other suitable metal covered with a proper protecting leather casing to prevent moisture from corroding the same, or in any other proper manner that will impart the desired stiffness or strength thereto.

To the upper end of each of the end pieces, *f* and *g*, of the cartridge-box *a*, and upon the inner surfaces thereof, is attached in any proper manner a short projecting pin or pivot, *h*, and upon each of which moves a link, *l*, made in the form of a groove permanently attached to each end piece, *m m*, and in the direction of their length of an inner receptacle or box, *n*, made with upper and lower compartments, *o o o*, &c., either adapted, as in Fig. 1, for the reception of loose cartridges, or, as seen in Fig. 3, for fixed or metallic cartridges, as may be desired.

Both surfaces of the sides *p p* of the box *n* are covered with leather pieces projecting, respectively, over the upper and lower portions, *q* and *r*, of the same, and forming flaps *s* and *t*, each of which folds partially around the box in opposite directions and has a strap, *u*, for preventing the moving of the box within its casing when it is fastened to the staple *d*, before referred to, as seen in Fig. 1.

The upper and lower ends or sides of the box are open. The flaps *s* and *t*, respectively, swing as coverings for the same, and the cartridges can be easily removed therefrom by simply swinging away its flap when the cartridge-case is in proper position to admit of the same, as will be presently described.

In the use of the cartridge-box the cartridges contained in the upper portion of the box are first used, and when the same have been wholly exhausted the strap securing or holding the cartridge-case to its outer box is then unfastened and the under portion of the case brought into proper position for the removal of the cartridges therefrom by simply turning up the case on its pivot or pins of the outer casing and then sliding the same back by its groove or link upon the same until its upper and then empty portion is brought into the lower part of the outer casing, where the box is again fastened by its strap, as before described. The flap covering the then upper portion of the box is swung away from the same, leaving it open so as to allow the cartridges to be removed therefrom as desired.

When the cartridge-case is not desired to be used, the outer flap, *r*, of the whole is fastened over the same in the usual manner.

From the above description it is apparent that by the peculiar manner in which the case containing the cartridges, whether fixed or loose, is hung within the outer casing or box, it enables the cartridge-case to be brought to the best possible position for the insertion or removal of cartridges therefrom as may be desired, the advantages of which over the ordinary and common style of cartridges-boxes are apparent to all conversant with the arming and equipment of soldiers.

The parts composing the cartridge case or box may be made of any desired and suitable material, size, form, and shape other than those herein specified.

I claim as new and desire to secure by Letters Patent—

The general arrangement of the cartridge-box herein described, the same consisting of an outer box or casing, in the interior of which a box divided into compartments suitable for the reception of cartridges, either loose or fixed, is hung, by means of the peculiar-shaped link or joint described, arranged and operating substantially as and for the purposes specified.

The above specification of my application for reissue of Letters Patent No. 43,373 signed by me this 17th day of May, 1865.

ROBT. A. CHESEBROUGH,

*Assignee of J. T. Warren.*

Witnesses:

M. M. LIVINGSTON,

OCTAVIUS KNIGHT.